(No Model.)
L. M. CARPENTER.
VEHICLE BRAKE.
No. 419,110. Patented Jan. 7, 1890.
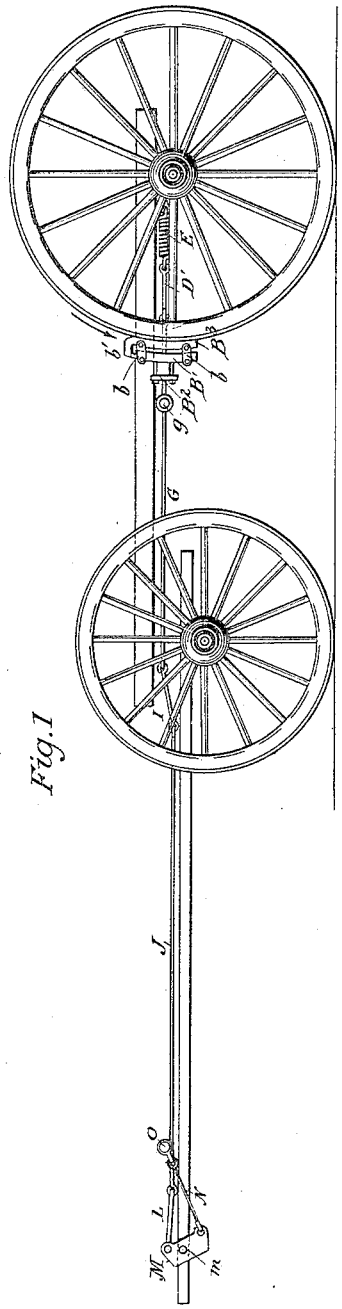
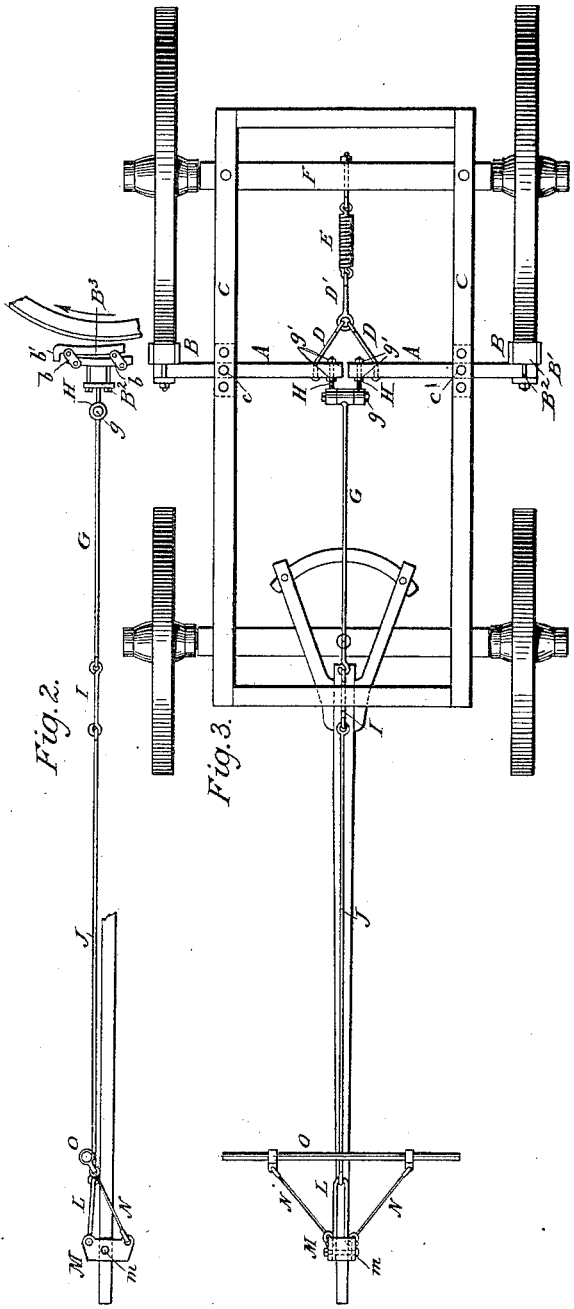
WITNESSES,
INVENTOR.
Leslie M. Carpenter
by Baldwin, Davidson & Wight
ATTORNEYS.

UNITED STATES PATENT OFFICE.

LESLIE M. CARPENTER, OF WOONSOCKET, RHODE ISLAND.

VEHICLE-BRAKE.

SPECIFICATION forming part of Letters Patent No. 419,110, dated January 7, 1890.

Application filed April 13, 1889. Serial No. 307,125. (No model.)

*To all whom it may concern:*

Be it known that I, LESLIE M. CARPENTER, a citizen of the United States, residing at Woonsocket, in the county of Providence and State of Rhode Island, have invented certain new and useful Improvements in Vehicle-Brakes, of which the following is a specification.

My invention relates to that class of vehicle-brakes in which the brakes are automatically applied to the wheels of the vehicle when the vehicle is descending a grade.

The object of the first part of my invention is to so arrange the brake-shoes that they will automatically adjust themselves, so that when the vehicle is moving forward and descending a grade the brakes may be firmly applied to the wheels to stop or impede their rotation, but when the vehicle is backed the brake-shoes yield, so as not to impede the rotation of the wheels. To this end my invention consists in connecting the brake-shoes to the brakes proper by hinge-connections, as hereinafter more fully explained.

The object of the next part of my invention is to provide improved means for connecting the brake to the team, so that in the act of holding back when descending a grade the team will automatically apply the brakes to the wheels. To this end my invention consists in mounting the brake-shoes on pivoted beams or levers connecting with rods, bars, or chains extending to the front of the vehicle-tongue and connected with a pivoted or hinged block mounted on the tongue and provided with a link or other suitable device or devices for connecting with the draft animal or animals.

My invention also consists in certain details of construction and organization of instrumentalities, hereinafter set forth and claimed.

In the accompanying drawings, illustrating my invention, Figure 1 is a side elevation of a vehicle running-gear with my invention applied; Fig. 2, a detail elevation of the brake devices detached from the vehicle, with the parts in the position they occupy when the horses are backing; and Fig. 3, a plan view of what is shown in Fig. 1.

The drawings show my invention applied to an ordinary wagon body or frame, which may be of any suitable construction.

A beam A, carrying a brake-shoe B, is pivoted to the sill C at $c$ on each side of the vehicle and extends outwardly therefrom, so as to hold the shoes B close to the hind wheels, and the inner ends of the beams come nearly together about midway between the sills. A link D, extending from the inner end of each beam, connects them with a link D', which is in turn connected with a spring E, fastened to the hind axle F or to some other suitable part of the vehicle in the rear of the brakes. The connections between the springs, the links D', and the links D are open or flexible, so as to give easy movement when in use. By this means the brake-beams are normally held to withdraw the shoes from the wheels. A rod G extends from the front end of the vehicle backwardly and is connected with the front ends of the bolts H, which extend from the inner ends of the beam A at right angles therewith. The outer ends or heads of the bolts H are flattened, as shown, and connected to the rod G by a bolt $g$, which gives an easy flexible joint at this point. The bolts H are screw-threaded, as shown, and provided with adjusting-nuts $g'$, by means of which the distance between the end of the rod and the ends of the bolts may be varied to tighten up the connections, and also accommodate wear of the brake-shoes. The outer or forward end of the rod G is connected by means of a link I to a rod J, which extends in line with the tongue K. The link I is connected to the rods G and J, as indicated, to give a flexible joint at each end. The forward end of the rod J is connected by means of a short link L to the front inner end of a pivoted block M, which is hinged to the tongue near its front end. The block M is provided with an opening through which the tongue extends, and which is sufficiently large to allow the free rocking movement of the block on its pivot $m$. The connections between the link L, the rod J, and the block are flexible, as shown, and permit of an easy movement without undue strain. The lower end of the block M is connected with one or more backwardly-extending rods, chains, or cords N, flexibly connected with the cross-piece O.

On the outer ends of the brake-beams A the bed-blocks B' of the brakes are secured by means of clips B² or other suitable connecting devices. The brake-shoes B³, which are suitably constructed to conform to the periphery of the wheels, are connected to the bed-blocks B' by link b, pivoted to the shoes on each side near each end and similarly connected to the bed-blocks. The upper ends of the brake-shoes are provided with rearwardly-extending arms b', adapted to rest on the tops of the bed-blocks B' when the brake-shoes are applied to the wheels and to limit the downward movement of the brake-shoes.

As indicated in Fig. 1, the brakes are applied to the wheels. It will be seen that if the wheels rotate in the direction indicated by the arrows, as they do when moving forward, the brake-shoes are not moved out of the way by the wheels; but if the wheels should move in an opposite direction the friction between the periphery of the wheels and the shoes would tend to lift the shoes and move them forwardly out of the way, so as not to impede rotation of the wheels or the backward movement of the vehicle.

It will be understood that if the vehicle is going downhill the horses hold back, and by reason of the connections N move the block M on its pivot, thus moving the link L, rod J, link I, rod G, bolts H, and inner ends of the beams A, thus moving the brake-shoes against the hind wheels. When moving on a level, the connections N are loose, so that no force is applied to move the brake forward, and the brake-shoes will be withdrawn from the wheels by means of the spring E and its connections. Of course when the vehicle is being backed the tendency would be to apply the brakes to the wheels; but, as before explained, a reverse movement of the wheel lifts and moves away the brake-shoes, so that their force is not felt.

I have shown my improvements embodied in a practical way; but it is obvious that all the details of construction shown are not necessary in carrying out my invention.

What I claim as my invention is—

1. The combination, substantially as hereinbefore set forth, of the pivoted brake-beam, the bed-block secured thereto, the brake-shoe, and the horizontal links hinged to the bed-block and to the brake-shoe, whereby the brake-shoe is yieldingly connected to the bed-block, for the purpose specified.

2. The combination, substantially as hereinbefore set forth, of the bed-block, the brake-shoe having at the top a laterally-projecting arm extending over the top of the bed-block, and the links hinged to the shoe and to the bed-block, whereby the shoe is free to move upwardly and outwardly from the wheel, but is prevented from moving downwardly.

3. The combination, substantially as hereinbefore set forth, of the pivoted brake-beams, the draft-rod G, the bolts H, pivotally connected to the draft-rod, and adjusting devices attaching the bolts H to the inner ends of the brake-beams.

4. The combination, substantially as hereinbefore set forth, of the pivoted brake-beams, the bed-blocks on the outer ends thereof, the brake-shoes flexibly connected with the bed-blocks, the spring connected with the inner ends of the brake-beams, the vehicle-tongue, the block pivoted on the forward end of the tongue, adjustable jointed connections between the block and the brake-beams, the cross-piece O, and the backwardly-extending rods flexibly secured to the ends of the cross-piece O and flexibly secured to the lower end of the pivoted block on the outer end of the vehicle-tongue.

In testimony whereof I have hereunto subscribed my name.

LESLIE M. CARPENTER.

Witnesses:
JEFFERSON ALDRICH,
PHILIP L. A. MILLER.